Feb. 21, 1956     O. H. BANKER     2,735,807
SELF-CLEANING APPARATUS FOR PURIFYING SEA WATER BY DISTILLATION
Filed Oct. 20, 1951
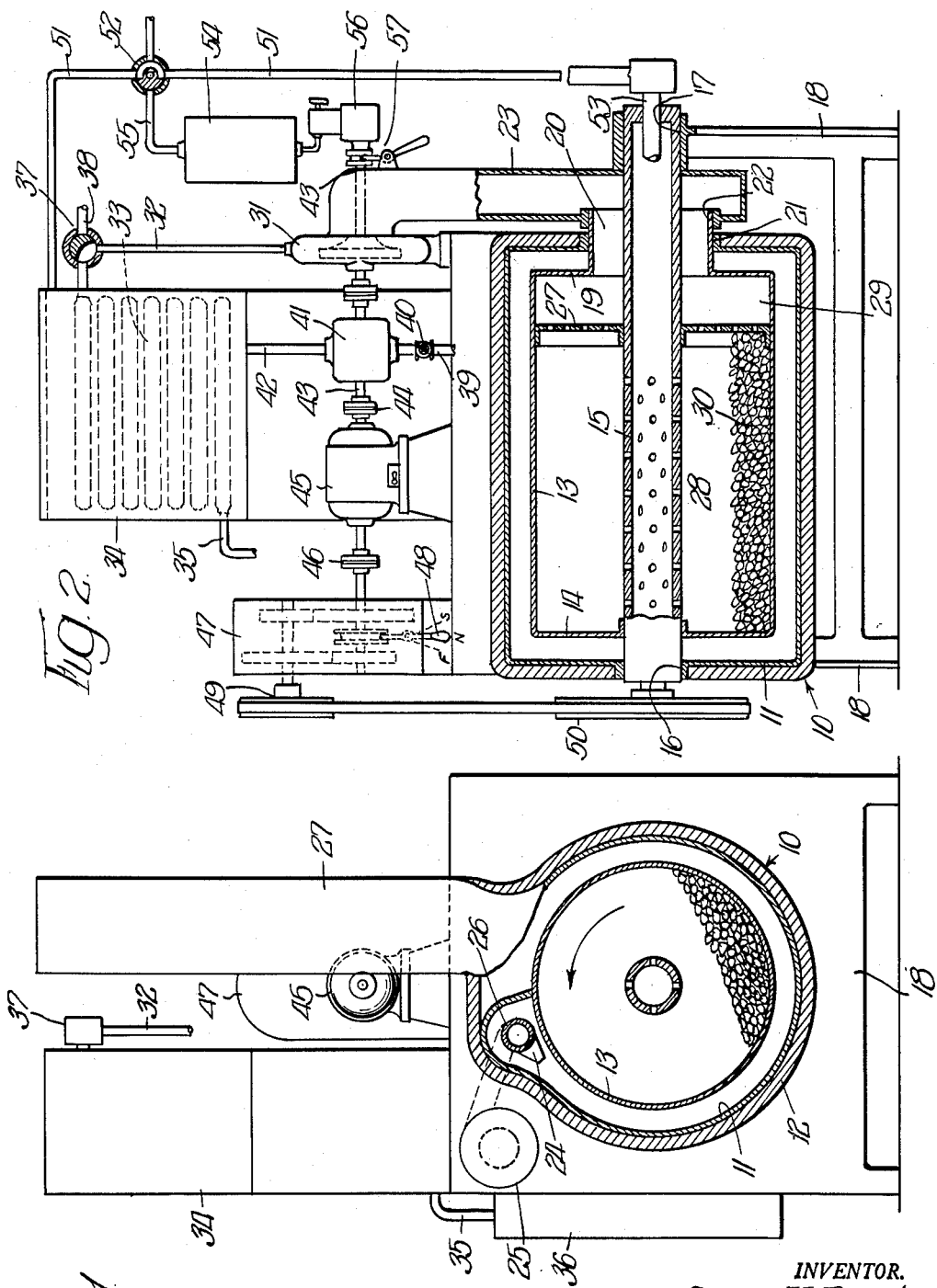
INVENTOR.
Oscar H. Banker,
BY
Cromwell, Greist & Warden
Attys

United States Patent Office 2,735,807
Patented Feb. 21, 1956

2,735,807

SELF-CLEANING APPARATUS FOR PURIFYING SEA WATER BY DISTILLATION

Oscar H. Banker, Evanston, Ill., assignor to New Products Corporation, Chicago, Ill., a corporation of Illinois Application October 20, 1951, Serial No. 252,223

19 Claims. (Cl. 202—238)

The present invention relates to a self-restorative system for purifying sea water to render the same fit for human consumption.

A problem confronted by the armed forces, in the field or afloat, is that of obtaining equipment adapted to derive from the sea or other natural source, usually impure or contaminated in character, an adequate supply of drinking or processing water of acceptable purity or potability. At the present time an attempt is made to cope with this problem by simple distillation equipment of more or less conventional design, but with far from satisfactory results. The shortcomings of equipment now in use stem from the fact that the salts, foreign matter and/or corrosive material of the sea water are quickly deposited on the evaporating surfaces of the equipment, rendering the same subject to quick and constant loss of efficiency.

It is customary to take such a unit apart and clean its evaporating surface thoroughly whenever its efficiency drops below 50% capacity. The periods intervening between such cleanings may be as little as one to three months, and the time consumed in servicing and reassembling the apparatus may be as much as two or three days. Obviously therefore, with efficiency constantly dropping from full rating to half rating, the average output of the machine cannot be assumed to exceed 65%–70% of its actual full capacity when new and clean. The present invention affords a self-restorative system whose average efficiency over a long period, and with relatively infrequent and quickly performed cleanings, is readily maintained at higher than 90% of its full, initial operating efficiency.

It is a general object of the invention to provide a vaporizer system or apparatus for purifying sea water which has improved provisions for restoring the same to initial, full scale output capacity, which provisions are readily controlled to switch the equipment from an evaporative water purifying phase to a restorative or cleaning phase, and vice versa.

Yet another object of the invention is to provide equipment of the foregoing sort made up of individual components of standard construction, readily obtainable on the market and capable of efficient operation by relatively unskilled persons.

Yet another object is to provide compact purification equipment which has very high output, in terms of water purified per hour, for an installation of predetermined size, and in which the cleaning unit functions rapidly and efficiently in brief, relatively infrequent periods in which it is called into play.

A more specific object of the invention is to provide vaporizer type purification equipment for sea or river water or water from other relatively impure source, comprising a drum rotatable in a heated chamber and partially filled with a mass of fragmentary, heat and wear-resistant aggregate material over which the sea water or other liquid to be purified is continuously discharged, with resultant vaporization thereof, together with a condenser unit connected to the drum to reclaim pure water from the vapor, this vaporizer-condenser equipment being associated with means to remove deposits and scale from the fragmentary material rapidly and efficiently upon rotation of the drum at a high rate of speed during a restorative phase, as compared to the normal speed of the drum in the vaporizing phase.

A still further specific object is to provide apparatus of the sort described in the preceding paragraph in which the vaporizing drum is selectively rotated at substantially different speeds through a selective gear box, and in which a condenser supply pump used only in the vaporizing phase, a vapor discharge vacuum pump or blower used in the vaporizing and restorative phases and an air compressor used only in the restorative phase, are all driven from the same motor driven shaft that actuates the gear box and drum.

The foregoing statements are indicative in a general way of the nature of the invention. Other and more specific objects will be apparent to those skilled in the art upon a full understanding of the construction and operation of the device.

A single embodiment of the invention is presented herein for purpose of illustration and it will be appreciated that the invention may be incorporated in other modified forms coming equally within the scope of the appended claims.

In the drawings:

Fig. 1 is a primarily schematic view in end elevation, being partially broken away and in transverse vertical section to illustrate generally the operating components of the present equipment, particularly the combustion chamber and rotary vaporizing drum thereof; and Fig. 2 is a further schematic view in side elevation, partially broken away and in vertical longitudinal section through the combustion chamber and drum, illustrating other operating relationships of the parts, as well as additional internal structural details of the chamber and drum.

The reference numeral 10 designates a combustion chamber comprising a heat resistant cylindrical internal steel shell 11 having applied thereto an outer casing 12 of fire-clay or equivalent heat insulating or refractory material. The reference numeral 13 designates a cylindrical, heat and wear resistant vaporizing drum of steel secured at its left-hand radial wall 14 to a perforated tubular shaft 15 which acts as a liquid intake member for the drum interior. This shaft is suitably mounted in a journal 16 at the left-hand end of fixed combustion chamber 10, as viewed in Fig. 2. The right-hand end of shaft 15 similarly rotates in a journal 17 on a frame-work or standard 18. The latter may also in part support chamber 10.

The right-hand end wall 19 of vaporizing drum 13 is provided with an annular vapor discharge throat 20 of substantial diameter in concentric, radially spaced surrounding relation to the shaft 15. Throat 20 is rotatably received in a right-hand end bearing 21 of combustion chamber 10, as well as in a bearing 22 carried at one side of an upright vapor discharge duct 23. Appropriate sealing provisions are associated with the respective bearings as necessary, all in an entirely conventional manner not requiring special illustration.

The combustion chamber 10 is provided with one or more combustion nozzles 24 internally thereof which are directed approximately tangentially of the outer surface of drum 12. These nozzles are supplied with a suitably mixed combustion gas or vapor from a blower and atomizer unit 25 and supply pipe 26, all of standard type. A vertical discharge flue 27 for products of combustion opens to atmosphere from a zone of combustion chamber 10 which is almost 360 degrees spaced from the burners 24.

Vaporizer drum 13 is internally divided by a radially extending, perforated plate 27 secured peripherally to the drum and to shaft 15, into a vaporizing space 28, in which actual flash vaporization of liquid supplied thereto through the perforated shaft 15 takes place, and a vapor discharge chamber or manifold 29 adjoining discharge throat 20. Vaporization chamber 28 is partially filled with an aggregate of pebbles, rocks, iron fragments, or any other suitable hard heat and wear-resistant material capable of presenting a non-absorptive vaporizing or flash surface. Suitable provisions of well known type may be made to enable access to the interior of drum 13 for charging or servicing the same.

The vapor discharge duct 23 extends upwardly to the suction intake of a conventional centrifugal blower 31. This blower has two functions, namely to withdraw and forward vapor from vapor discharge manifold 29 and throat 20 during the vaporizing stage of operation of the system, and similarly during the restoring to withdraw and forward powdery salts, dried sludge, foreign matter and the like deposited on the mass of fragments 30 and dislodged therefrom during the restoring phase. The discharge side of blower 31 is communicated through a pipe 32 with a condenser coil 33 arranged in an elevated condenser casing 34 which is suitably supported by frame 18. Coil 33 terminates in a discharge pipe 35 through which purified water is led to a suitable storage container 36, also supported by the frame.

A standard three-way valve 37 is placed in pipe 32 between the condenser coil 33 and the blower 31. This valve is shown in Fig. 2 in its vaporizing stage position, in which communication of the pipe with the condenser coil 33 is established. It may also be manipulated to another position in which blower 31 is communicated through pipe 32 with a discharge pipe 38 leading to atmosphere or a suitable storage bin (not shown). A sea water intake or supply line is designated 39 and is controlled by a manual shut off valve 40. This supply line leads to the intake side of conventional pump 41, and the discharge line 42 of the pump opens to the condenser casing 34.

Pump 41 is driven by a drive shaft 43 connected through a flexible coupling 44 to a motor 45. The motor is also connected through a coupling 46 with a change speed gear box 47 of conventional design which is adapted to be controlled by a hand lever 48. Thus the motor operates a pulley 49 on the gear box output shaft at fast or slow speed or discontinues drive of the pulley when the lever is in an intermediate neutral position. Pulley 49 is belt connected to a pulley 50 on the tubular shaft 15 of vaporizer drum 13.

Condenser casing 34 is provided adjacent the top thereof with a liquid discharge line 51 leading to the interior of shaft 15, through which condensing water, pre-heated in the casing, is drawn off during the vaporizing cycle and led to the vaporizing drum. A standard three-way valve 52 is placed in line 51 and the latter discharges to the interior of shaft 15 by means of a tube 53 opening through a closure plug in the end of the shaft. Valve 52 is shown in its position for the vaporizing phase, establishing communication of the condenser casing with shaft 15. It may also be manipulated to connect the portion of the line 51 beneath the valve with an air tank 54, by means of a short line 55. This tank supplied with compressed air by a small air compressor 56, the compressor being selectively coupled to and uncoupled from the drive shaft 43 by means of a conventional manually controllable clutch 57.

The system as illustrated is in readiness for its vaporization stage of operation. The combustion unit 24 is first operated a sufficient period of time to heat the drum 31 and mass of fragments 30 therein and manual valve 40 is opened. Speed control lever 48 is shifted counterclockwise to effect a slow speed setting of gear box 47 and motor 45 is switched on. Air pump 56 is declutched from shaft 43. Sea water is thus forwarded by pump 41 through supply lines 39, 42, condenser casing 34, line 51 and valve 52 to the interior of shaft 15, through the perforations of which it flows into vaporizing chamber 28 of drum 13. It is vaporized by the heated fragments 30 as the drum rotates at slow speed, i. e., approximately 1 R. P. M.

The vapor is drawn out by the vacuum pump 31 through the perforations of plate 27, manifold 29, discharge throat 20 and duct 23 and is forwarded through line 32 and valve 37 into and through the condenser coil 33. It issues from tube 35 as clear, purified and potable water and is collected in the reservoir 36. These operations are automatically carried out as a continuing cycle for as long a period as is deemed necessary.

As soon as the fragments 30 in drum 13 become fouled by the deposition thereon of salts, dirt, sludge or other foreign matter, a restoring or cleaning phase is initiated. Valve 40 is first closed to shut off the sea water supply and operation of drum 13 is continued at slow speed until the water in the condenser discharge line 51 has been evaporated and the inside of the drum is thoroughly dry. Three-way valve 37 is now shifted to communicate vacuum pump discharge line 32 with the line 38 leading to a storage bin or to atmosphere. Speed control lever 48 is shifted clockwise to fast speed position, in which position the gear box 47 accelerates rotation of drum 13 to 50 R. P. M. or more. The air pump 56 is preferably declutched from shaft 43 at this time, and three-way valve 52 is left in its original position.

Under the increased speed of drum operation the fragmentary material 30 within drum chamber 28 is violently agitated, with the result that all particles of salts, foreign materials, etc., which have been deposited thereon are dislodged therefrom, as well as from the inner surface of the drum, and are reduced to a fine dust or powder in a short time. This dust is drawn off from the drum under vacuum induced by blower 31 and discharged through lines 32, 38. Discharge will usually be to atmosphere, however, in the event it is desired to reclaim any of the deposited salts or other particles, the line 38 may lead to a suitable storage bin.

The bulk of the reduced, powdery material is disposed of by suction in the above fashion; however, in order to still more thoroughly clean the inside of the drum it may be desirable to create a turbulence therein, so as to positively separate the particles from surfaces to which they tend to adhere, in addition to the use of vacuum. To this end valve 52 is now shifted to open the air storage tank discharge line 55 to the line 51, and clutch 57 is manipulated to couple air compressor pump 56 with the main drive shaft 45. A positive air blast is now driven through the perforations of tubular shaft 15 to the interior of the drum, with the result that dry powder not previously sucked out is dislodged and discharged from the drum and drawn under a combined turbulence and vacuum effect.

When the operator observes that the exhaust from pipe 38 is dust free, motor 45 may be switched off or gear box 47 may be re-set as originally described for another vaporization cycle. An entire restorative cycle consumes no more than an hour or so, a brief period indeed as compared with the cleaning procedures necessary to restore existing sea water evaporating systems to acceptable efficiency.

If desired, suitable openings, which are normally closed by drain plugs may be provided in the drum 13 to enable its interior to be flushed out hydraulically, in addition to the described vacuum and air pressure renewal operations.

I claim:

1. A self-cleaning liquid purifying system comprising a rotary drum, a charge of aggregate vaporizing material in said drum, means to heat said charge during rotation of the drum, a hollow perforated shaft disposed coaxial of and within said drum, means for rotating said drum at high and low speeds to agitate said material, a condenser casing having a condenser coil therein, said casing being connected through a liquid discharge line with the interior of said hollow shaft, and a vapor discharge duct communicating said coil with the interior of said drum through a throat concentric with and radially spaced from said shaft, said shaft extending through said throat.

2. A self-cleaning liquid purifying system comprising a rotary drum adapted to receive a charge of aggregate vaporizing material and having means to heat said charge during rotation of the drum, a hollow perforated shaft disposed coaxial of and within said drum, means for rotating said drum at high and low speeds, a condenser casing having a condenser coil therein, said casing being connected through a liquid discharge line with the interior of said hollow shaft, a vapor discharge duct communicating said coil with the interior of said drum through a throat concentric with and radially spaced from said shaft, and valve means for selectively connecting said vapor discharge duct with said condenser coil or with a further disposal point.

3. A self-cleaning liquid purifying system comprising a rotary drum adapted to receive a charge of aggregate vaporizing material and having means to heat said charge during rotation of the drum, a hollow perforated shaft disposed coaxial of and within said drum, means for rotating said drum at high and low speeds, a condenser casing having a condenser coil therein, said casing being connected through a liquid discharge line with the interior of said hollow shaft, a vapor discharge duct communicating said coil with the interior of said drum through a throat concentric with and radially spaced from said shaft, valve means for selectively connecting said vapor discharge duct with said condenser coil or with a further disposal point, a source of air pressure, and further valve means to selectively connect a portion of said liquid discharge line with the interior of said shaft and with said source of air pressure.

4. A self-cleaning liquid purifying system comprising a rotary drum adapted to receive a charge of aggregate vaporizing material and to be heated during rotation of the drum, a prime mover, means actuated by said prime mover for rotating said drum at high and low speeds, a condenser casing having a condenser coil therein and provided with a liquid discharge line, a pump supplying liquid to said casing, vapor discharge means including a vacuum pump having its intake connected to the interior of said drum and its output connected to said condenser coil, a valve for selectively connecting said vapor discharge means with said coil or with another disposal point, and means including a further valve selectively connecting the interior of said drum with said liquid discharge line or with a source of air pressure, said pumps being driven by said prime mover.

5. A system in accordance with claim 4 in which said source of air pressure includes a compressor clutch connected to said prime mover.

6. Self-cleaning evaporator equipment comprising a vaporizor drum adapted to receive a charge of aggregate material, means to heat said material in said drum, means operable to move said drum at two distinct speed ranges to agitate said material with two distinct degrees of violence, a discharge duct in communication with the interior of said drum, a condenser device supplied by said duct during slow speed operation of the drum, a disposal line communicating with said duct during high speed operation of the drum, and selectively operable means to control communication of said duct with said condenser device or with said disposal line.

7. Self-cleaning evaporator equipment comprising a combustion chamber, a vaporizor drum adapted to receive a charge of aggregate material and mounted for movement in said chamber, means operable to move said drum at two distinct speed ranges to agitate said material with two distinct degrees of violence, a discharge duct in communication with the interior of said drum, a condenser coil supplied by said duct during slow speed operation of the drum, a disposal line communicating with said duct during high speed operation of the drum, and selectively operable means to communicate said duct with said coil or with said disposal line.

8. Self-cleaning evaporator equipment comprising a vaporizer drum adapted to receive a charge of aggregate material, means to heat said material in said drum, means operable to move said drum at two distinct speed ranges to agitate said material with two distinct degrees of violence, a discharge duct in communication with the interior of said drum, a condenser coil supplied by said duct during slow speed operation of the drum, a disposal line communicating with said duct during high speed operation of the drum, selectively operable means to communicate said duct with said coil or with said disposal line, a condenser casing housing said coil and provided with means to supply liquid thereto, and a liquid discharge line from said casing to the interior of said drum.

9. Self-cleaning evaporator equipment comprising a combustion chamber, a vaporizer drum adapted to receive a charge of aggregate material and mounted for movement in said chamber, means operable to move said drum at two distinctly different speeds to agitate said material with two distinct degrees of violence, a discharge duct in communication with the interior of said drum, a condenser coil supplied by said duct during slow speed operation of the drum, a disposal line communicating with said duct during high speed operation of the drum, selectively operable means to communicate said duct with said coil or with said disposal line, a condenser casing housing said coil and provided with means to supply liquid thereto, and a liquid discharge line from said casing to the interior of said drum.

10. Self-cleaning evaporator equipment comprising a vaporizer drum to receive aggregate material, means to shift said drum sufficiently to agitate said material, said shifting means comprising a device to control the shifting of the drum at said two distinct speeds so as to produce agitation of the material in two distinct degrees of violence, means to heat said material in said drum, a condenser coil supplied by said drum when the same is shifted relatively slowly, a disposal line supplied by said drum when the same is shifted at a distinctly higher speed, and means selectively connecting the interior of said drum with said coil or with said disposal line.

11. Self-cleaning evaporator equipment comprising a vaporizer drum to receive aggregate material, means to heat said material in said drum, means to rotate said drum at two distinctly different speeds to agitate said material in two distinct degrees of violence, a condenser coil supplied by said drum when the same is shifted relatively slowly, a disposal line supplied by said drum when the same is shifted at a distinctly higher speed, and means selectively connecting the interior of said drum with said coil or with said disposal line.

12. Self-cleaning evaporator equipment comprising a vaporizer drum to receive aggregate material, means to shift said drum sufficiently to agitate said material, said shifting means comprising a device to control the shifting of the drum at said two distinct speeds so as to produce agitation of the material in two distinct degrees of violence, means to heat said material in said drum, a condenser coil supplied by said drum when the same is shifted relatively slowly, a disposal line supplied by said drum when the same is shifted at a distinctly higher speed, means selectively connecting the interior of said drum with said coil or with said disposal line, and a condenser casing containing said coil, said casing being provided with means to supply liquid thereto and with a liquid discharge line to the interior of said drum.

13. Self-cleaning evaporator equipment comprising a vaporizer drum to receive aggregate material, means to shift said drum sufficiently to agitate said material, said shifting means comprising a device to control the shifting of the drum at said two distinct speeds so as to produce agitation of the material in two distinct degrees of violence, means to heat said material in said drum, a condenser coil supplied by said drum when the same is shifted relatively slowly, a disposal line supplied by said drum when the same is shifted at a distinctly higher speed, means selectively connecting the interior of said drum with said coil or with said disposal line, a condenser casing containing said coil, said casing being provided with means to supply liquid thereto and with a liquid discharge line to the interior of said drum, a compressor, and means selectively connecting the interior of said drum with said liquid discharge line or with said compressor.

14. Self-cleaning evaporator equipment comprising a vaporizer drum to receive aggregate material, means to heat said material in said drum, means to rotate said drum at two distinctly different speeds to agitate said material in two distinct degrees of violence, a condenser coil supplied by said drum when the same is shifted relatively slowly, a disposal line supplied by said drum when the same is shifted at a distinctly higher speed, means selectively connecting the interior of said drum with said coil or with said disposal line, a condenser casing containing said coil, said casing being provided with means to supply liquid thereto and with a liquid discharge line to the interior of said drum, a compressor, and means selectively connecting the interior of said drum with said liquid discharge line or with said compressor.

15. Self-cleaning evaporator equipment comprising a vaporizer drum to receive aggregate material, means to shift said drum sufficiently to agitate said material, said shifting means comprising a device to control the shifting of the drum at said two distinct speeds so as to produce agitation of the material in two distinct degrees of violence, means to heat said material in said drum, a vapor discharge duct communicating with the interior of said drum, a condenser coil supplied by said drum when the same is shifted relatively slowly, a disposal line supplied by said drum when the same is shifted at a distinctly higher speed, means to withdraw vapor and the like from said drum through said duct and forward the same to said coil including a manually controllable valve selectively operable to communicate said duct with said coil or with said disposal line, a condenser casing housing said coil and provided with means to supply liquid thereto, a liquid discharge line from said casing to the interior of said drum, a compressor, and a manually operable valve selectively communicating said compressor or said liquid discharge line with the interior of said drum.

16. Self-cleaning evaporator equipment comprising a vaporizor drum to receive aggregate materials, means to shift said drum sufficiently to agitate said material, said shifting means comprising a device to control the shifting of the drum at said two distinct speeds so as to produce agitation of the material in two distinct degrees of violence, means to heat said material in said drum, a vapor discharge duct communicating with the interior of said drum, a condenser coil supplied by said drum when the same is shifted relatively slowly, a disposal line supplied by said drum when the same is shifted at a distinctly higher speed, means to withdraw vapor and the like from said drum through said duct and forward the same to said coil including a vacuum pump having its intake connected to said discharge duct and a manually controllable valve selectively operable to communicate the discharge of said pump with said coil or with a disposal line, a condenser casing housing said coil and provided with means to supply liquid thereto, a liquid discharge line from said casing to the interior of said drum, a compressor, and a manually operable valve selectively communicating said compressor or said liquid discharge line with the interior of said drum.

17. A self-cleaning liquid purifying system comprising a rotary drum, a charge of aggregate vaporizing material in said drum, means to heat said material during rotation of the drum, a prime mover, means actuated by said prime mover for rotating said drum at distinctly different high and low speeds to agitate said material in distinctly different degrees of violence, a condenser casing having a condenser coil therein, a pump supplying liquid to said casing, said casing being connected through a liquid discharge line with the interior of said drum when the latter is rotating at relatively low speed, vapor discharge means including a vacuum pump having its intake connected to the interior of said drum, said pump having its output connected to said condenser coil during said low speed rotation of the drum and to a disposal point during high speed rotation thereof.

18. Self-cleaning evaporator equipment comprising a vaporizor drum adapted to receive a charge of aggregate material, means to heat said material in said drum, means operable to move said drum at two distinct speed ranges to agitate said material in two distinct degrees of violence, a condenser device supplied by said drum during slow speed operation thereof, a disposal line supplied by said drum during high speed operation thereof, and selectively operable means to control communication of said drum with said condenser device and with said supply line.

19. Evaporator equipment in accordance with claim 18 in which said drum moving means comprises a speed control unit operable arbitrarily to change the speed of the drum directly from low to high, and vice versa.

References Cited in the file of this patent

UNITED STATES PATENTS

| | | |
|---|---|---|
| 412,912 | Blessing | Oct. 15, 1889 |
| 788,310 | Fleming | Apr. 25, 1905 |
| 1,296,367 | Cockran | Mar. 4, 1919 |
| 2,138,973 | Lege | Dec. 6, 1938 |
| 2,174,008 | Mow | Sept. 26, 1939 |